J. C. BLOOM.
Draft-Equalizer.
No. 213,383.    Patented Mar. 18, 1879.
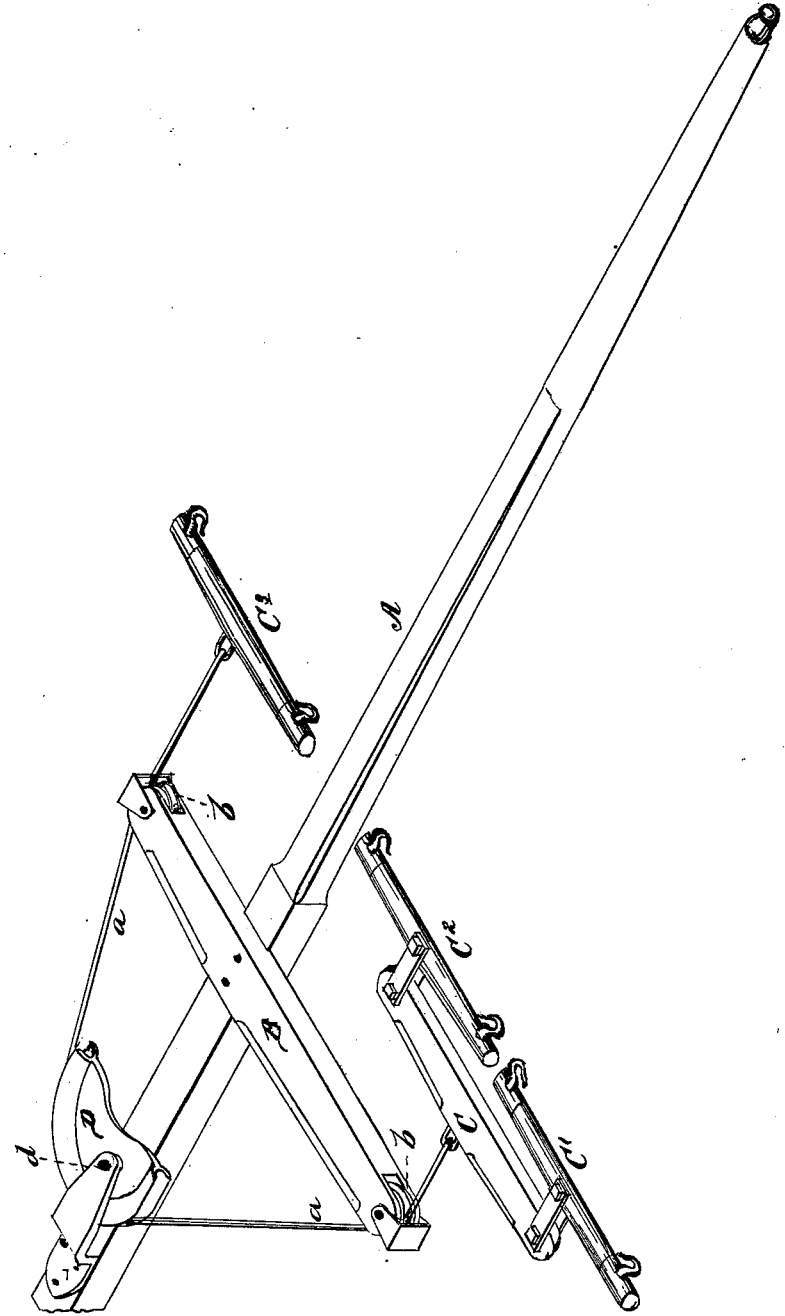

UNITED STATES PATENT OFFICE.

JOHN C. BLOOM, OF KALAMAZOO, MICHIGAN.

IMPROVEMENT IN DRAFT-EQUALIZERS.

Specification forming part of Letters Patent No. 213,383, dated March 18, 1879; application filed August 17, 1878.

*To all whom it may concern:*

Be it known that I, JOHN C. BLOOM, of Kalamazoo, in the county of Kalamazoo and State of Michigan, have invented a new and valuable Improvement in Three-Horse Equalizers; and I do hereby declare that the following is a full, clear, and exact description of the construction and operation of the same, reference being had to the annexed drawing, making a part of this specification, and to the letters and figures of reference marked thereon.

The drawing represents a view, in perspective, of my equalizer.

The nature of my invention consists in the construction and arrangement of a three-horse equalizer, as will be hereinafter more fully set forth.

The annexed drawing, to which reference is made, fully illustrates my invention.

A represents the tongue or pole, provided near its rear end with a cross-bar, B, rigidly secured to it, and extending at unequal distances on both sides of the tongue.

At each end of the cross-bar B is mounted a pulley, $b$, and around these pulleys is passed a chain, $a$. To the end of this chain, at the shorter end of the cross-bar, is connected a single-tree, $C^3$, for the third horse, while to the other end of the chain, at the longer end of the cross-bar, is connected a double-tree, C, with two single-trees, $C^1$ and $C^2$, for the two horses.

The chain $a$ also passes around a partial pulley, D, pivoted on the rear portion of the tongue A by a bolt, $d$, which is placed eccentrically in the same, the longer portion of this partial pulley being on the side of the single or third horse.

It will, therefore, readily be seen that under any draft the third horse has double the amount of leverage that the two horses have working on the evener. This is under a steady draft of the three horses. At the same time, should the third horse drop back, the leverage in his favor is increased, and vice versa with the two horses.

What I claim as new, and desire to secure by Letters Patent, is—

The combination of the pole A, rigid cross-bar B, with pulley $b$ at each end, the eccentrically-pivoted partial pulley D, and the chain $a$, with double and single trees, substantially as and for the purpose set forth.

In testimony that I claim the above I have hereunto subscribed my name in the presence of two witnesses.

JNO. C. BLOOM.

Witnesses:
BURR BANNISTER,
JOHN MCKEE, Jr.